United States Patent [19]

Major

[11] 4,415,242

[45] Nov. 15, 1983

[54] CAMERA LENS COVER AND SUNSHADE APPARATUS

[76] Inventor: Frederick A. Major, 1725 E. Ellis Dr., Tempe, Ariz. 85282

[21] Appl. No.: 229,454

[22] Filed: Jan. 29, 1981

Related U.S. Application Data

[63] Continuation-in-part of Ser. No. 112,731, Jan. 17, 1980, abandoned.

[51] Int. Cl.³ ............................................. G02B 11/04
[52] U.S. Cl. .................................... 350/581; 350/587
[58] Field of Search ....................... 350/60, 59, 58, 57, 350/65

[56] References Cited

U.S. PATENT DOCUMENTS

| 2,093,237 | 9/1937 | Dolecki | 350/60 |
| 3,715,149 | 2/1973 | Freeland | 350/58 |
| 4,045,117 | 8/1977 | Lerner | 350/60 |

*Primary Examiner*—Jon W. Henry
*Attorney, Agent, or Firm*—H. Gordon Shields

[57] ABSTRACT

A combination lens cover and sunshade for a camera includes a plurality of pivotable pedals which move from a closed position, comprising a lens cover, to an open position, comprising a sunshade for the camera lens and the pivoting is accomplished by cam action.

19 Claims, 27 Drawing Figures

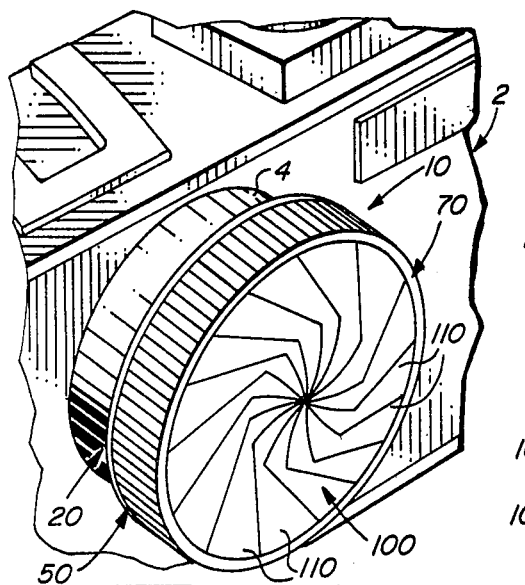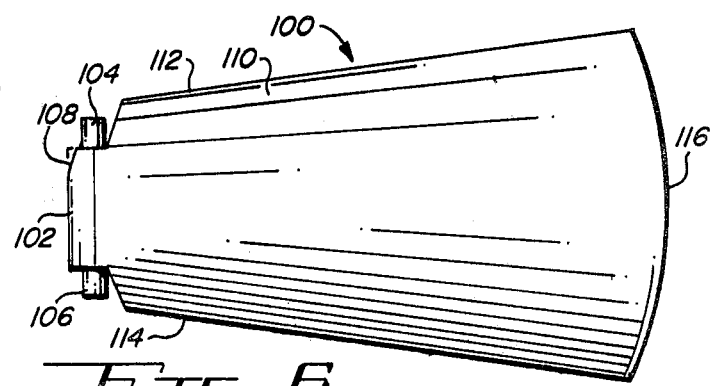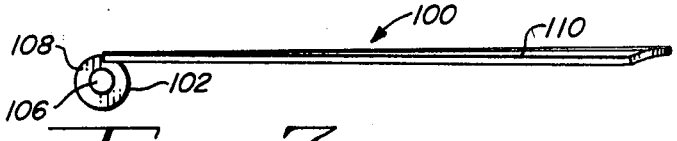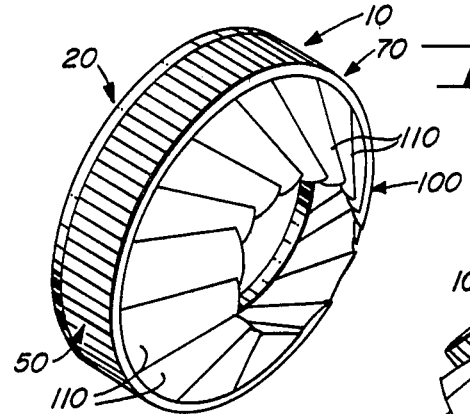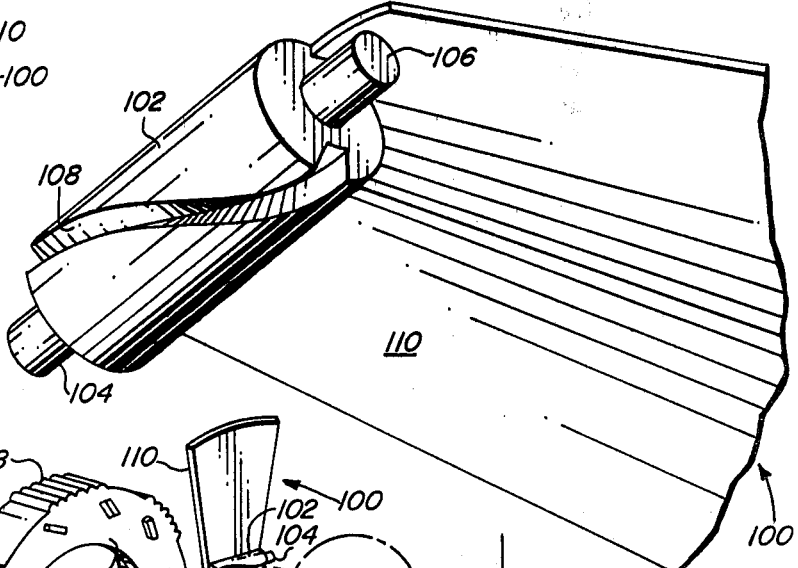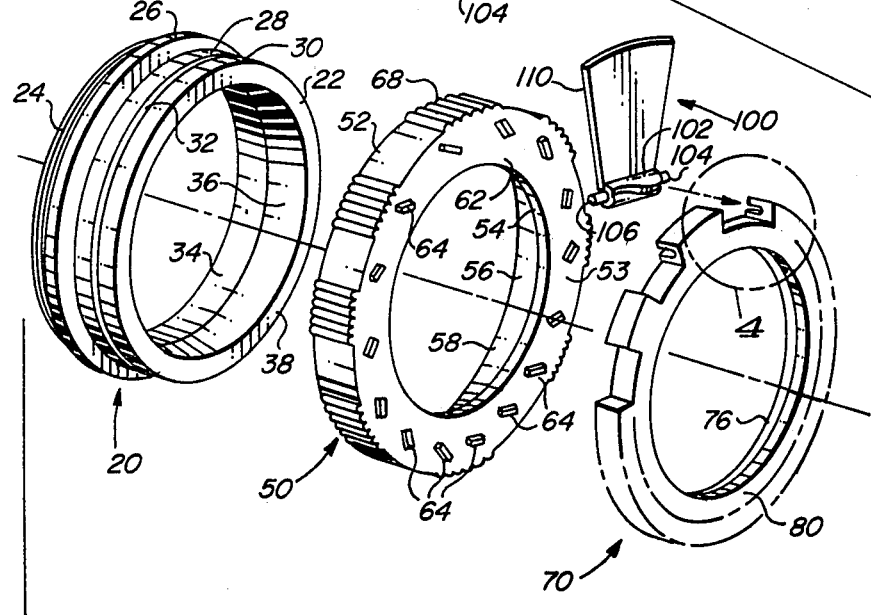

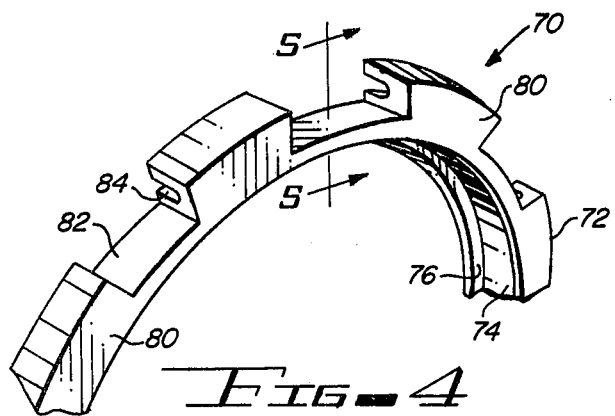
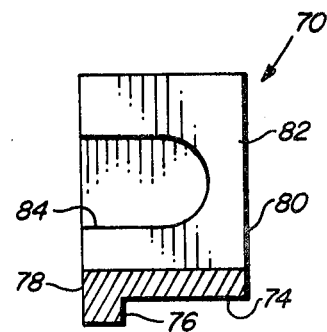
FIG-4  FIG-5
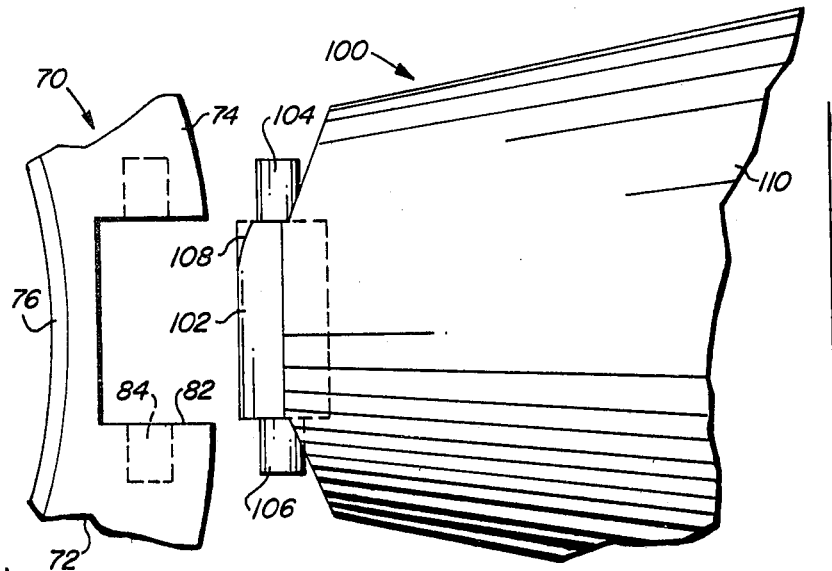
FIG-10
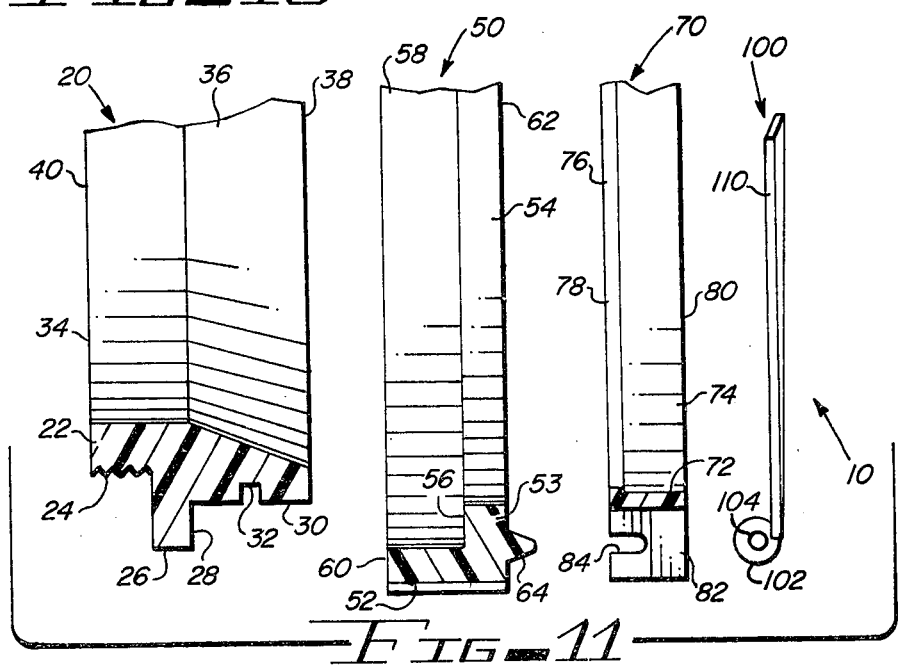
FIG-11

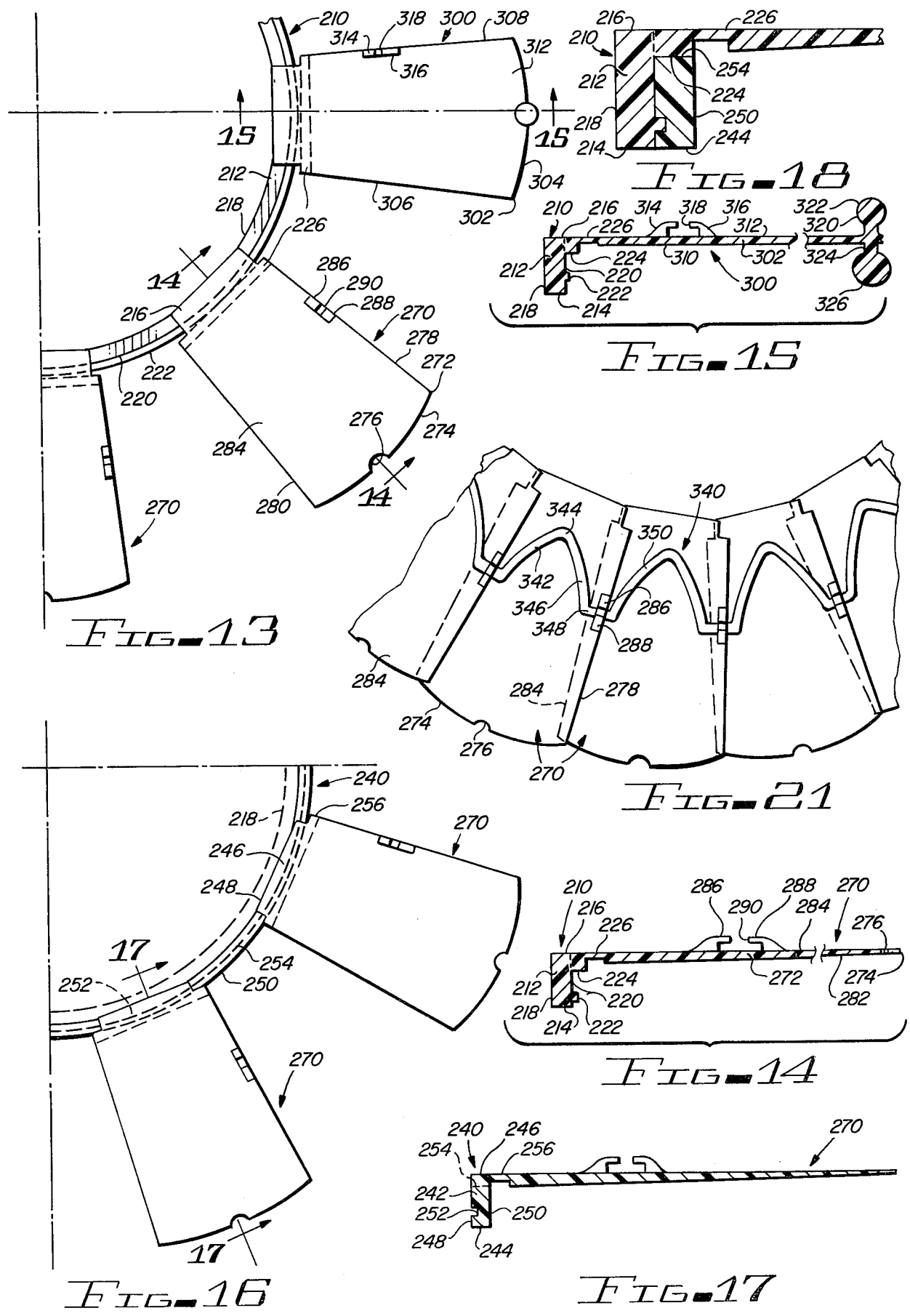

CAMERA LENS COVER AND SUNSHADE APPARATUS

CROSS-REFERENCE TO RELATED APPLICATION

This is a continuation-in-part application of copending application, Ser. No. 112,731, filed Jan. 17, 1980, now abandoned.

BACKGROUND OF THE INVENTION

1. Field of the Invention

This invention relates to camera apparatus and, more particularly, to a combination lens cover and sunshade for a camera lens.

2. Description of the Prior Art

U.S. Pat. No. 1,283,963 discloses a lens shield for a camera lens. The lens shield is pivotally secured to an attachment ring which fits over the lens barrel of a camera. The shield pivots over the lens and away from the lens, as desired.

U.S. Pat. No. 1,775,180 discloses a light screen for the lens of a camera. The screen comprises a pivoting element secured to the lens barrel of a camera and pivotable through an arc to protect the lens from light sources which otherwise would be directed at the lens.

U.S. Pat. No. 2,266,914 discloses a foldable sunshade which includes four rectangular or square elements, each of which is pivotally secured at right angles to the adjacent element. All of the elements may be opened, or any combination of them may be opened (pivoted away from the lens) to provide shade.

U.S. Pat. No. 3,390,931 discloses a telescoping eye piece assembly for shading the eye piece of a telescope. The apparatus includes a self-closing segmented shutter disposed within an accordion type folder member in which the accordion member is compressed, and the compression force causes the segmented shutter to open. By removing the compressing force on the accordion type folded member, the segmented shutter returns to its normally closed position, covering the lens.

U.S. Pat. No. 3,399,011 discloses another type of pivoting or hinged lens cap and sunshade. The pivoting action is accomplished by means of a spring biased element movable in a slot.

U.S. Pat. No. 3,715,149 discloses a foldable sunshade and lens cap apparatus having a tubular sunshade and a plurality of flaps disposed within the sunshade. The flaps pivot inwardly to a closed position to cover the lens, and outwardly to an open position, away from the lens. The pivoting is accomplished by a camming action against the base of the flaps by means of a threaded element, the rotation of which causes the element to move against and away from the base of the flaps. The sunshade is accordingly rotated relative to the lens, and the axial movement of the sunshade results in the pivoting action of the flaps.

U.S. Pat. No. 3,942,864 discloses a cap secured to the lens of a camera by a threaded connection and a pivotable lens cover. The pivoting movement of the cover is accomplished by the rotation of the cap relative to the camera lens. The rotary movement results in a camming action which causes the lens cap to pivot toward and away from the lens.

U.S. Pat. No. 4,045,117 discloses a combination lens cap and lens shade which includes a plurality of movable flaps, each of which includes a folded engagement with an adjacent flap. The opening of the folded flaps to the full open position allows the use of the apparatus as a sunshade, and the inward or folding of the flaps results in a lens cover. A second embodiment replaces the folding action by mechanical linkage for the pivoting action of the flaps. In both embodiments, the flaps overlie each other and have a predetermined folding order which results in the sequential movement of the flaps, both open and closed.

In the '117 patent, the maximum movement of the flaps comprises a ninety degree movement to define the opening for the lens. In the '149 patent, the sunshade is fixed relative to the lens and it accordingly does not move or fold against the lens, but rather requires a second lens cap element which acts in conjunction with the rotation of the sunshade. The '931 patent similarly requires two elements for the opening and closing of the sunshade and lens covering. However, the purpose of the apparatus is substantially different from providing a cover and a shade for a lens. Rather, the purpose of the apparatus of the '931 patent is to limit the amount of external light which may impinge on the objective lens of an eyepiece. Two elements are used to accomplish this. The user must provide a positive engagement with the external element in order to maintain the internal element in an open, usable condition. When the external force is removed from the outer element, the internal, cover element, automatically closes.

The other patents described above comprise different types of straight pivoting action of a single element or, as in the '914 patent, a plurality of elements, which moves from a full open position to a full closed position. The apparatus generally comprises lens covers which move by various types of mechanical linkage to move between two fixed positions, from closed to open, and vice-versa.

None of the apparatus of the prior art discloses a combination lens cap and sunshade which may move through an arc or distance of greater than ninety degrees, or less than ninety degrees, as desired. The apparatus of the present invention comprises a relatively simple, inexpensive apparatus which pivots in response to a rotary movement from a closed lens cover position to a fully open lens shade position. The elements of the cover may pivot through an arcuate distance of greater than ninety degrees.

SUMMARY OF THE INVENTION

The invention described and claimed herein comprises, in one embodiment, three rings, one of which is movable relative to the outer two, and one of the fixed rings includes a plurality of pivotable elements which move from a fully closed to a fully open position by the cam action of a plurality of cams secured to the relatively movable ring. In a second embodiment, two rings are used, both of which include pivotable elements.

Among the objects of the present invention are the following:

To provide new and useful lens cover apparatus;

To provide new and useful light shade apparatus for a lens;

To provide new and useful lens cover and sun or light shade apparatus for a camera;

To provide new and useful apparatus for covering the lens of a camera actuable by rotary movement;

To provide new and useful lens cover apparatus having a plurality of pivotable elements;

To provide new and useful lens cover apparatus having a plurality of elements pivotable over an arcuate distance of greater than ninety degrees from a fully closed to a fully open position; and To provide new and useful lens cover apparatus actuated by rotary movement for causing a plurality of elements to pivot relative to each other and to a lens.

BRIEF DESCRIPTION OF THE DRAWING

FIG. 1 is a perspective view of a camera with the lens cover apparatus of the present invention secured thereto.

FIG. 2 is a perspective view of the combination lens cover and sunshade apparatus of the present invention.

FIG. 3 is an exploded perspective view of the elements included in the apparatus of the present invention.

FIG. 4 is an enlarged fragmentary view of a portion of the apparatus of FIG. 3 taken generally from circle 4 of FIG. 3.

FIG. 5 is a view in partial section of the apparatus of FIG. 4 taken generally along line 5—5 of FIG. 4.

FIG. 6 is a plan view of an element included in the apparatus of the present invention.

FIG. 7 is a side view of the element of FIG. 6.

FIG. 8 is an end view of the element of FIGS. 6 and 7.

FIG. 9 is a perspective view of a portion of the element of FIGS. 6, 7, and 8.

FIG. 10 is a top view of a portion of the apparatus of the present invention.

FIG. 11 is a view in partial section of the elements of the present invention spaced apart from each other.

FIG. 13 is a top view of a portion of the alternate embodiment.

FIG. 14 is a view in partial section of a portion of the apparatus of FIG. 13 taken generally along line 14—14 of FIG. 13.

FIG. 15 is a view in partial section of the apparatus of FIG. 13 taken generally along line 15—15 of FIG. 13.

FIG. 16 is a top view of another portion of the alternate embodiment.

FIG. 17 is a view in partial section of the apparatus of FIG. 16 taken generally along line 17—17 of FIG. 16.

FIG. 18 is a view in partial section of the assembled apparatus of FIGS. 13 and 16, illustrating the securing together of the apparatus shown in FIGS. 13 and 16.

FIG. 21 is a view illustrating a portion of the assembled apparatus of FIGS. 13, 16 and 19.

DESCRIPTION OF THE PREFERRED EMBODIMENT

Figure 12:
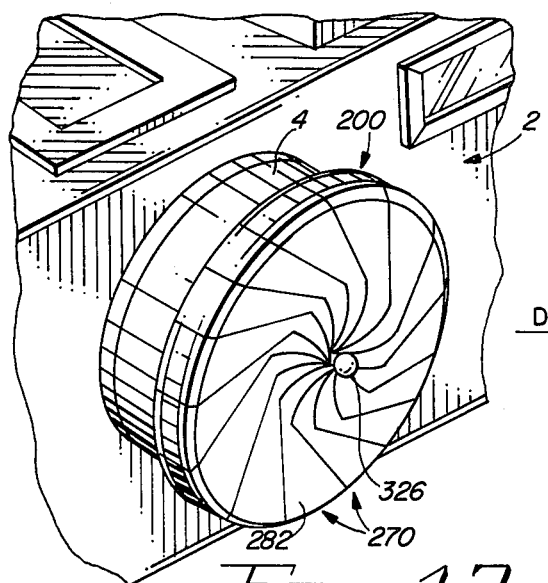
FIG. 12 is a perspective view of a camera with an alternate embodiment of the present invention.

FIG. 1 comprises a perspective view of a camera 2 having a lens barrel 4 which extends outwardly from the camera. A lens cover and sunshade apparatus 10 is secured to the lens barrel 4. The lens cover and sunshade apparatus 10 includes three rings secured to each other and to the lens barrel 4. The rings include a base ring 20, a cam ring 50, and a petal ring 70. Included with the petal ring 70 are a plurality of petals 100 which pivot from the ring 70 inwardly to form the lens cover, as shown in FIG. 1, and which pivot outwardly to form the sunshade. The outward pivoting of the petals 100 is illustrated in FIG. 2, with the petals 100 pivoted to about their half-way position.

FIG. 2 comprises a perspective view of the three rings 20, 50, and 70, which comprise the lens cover and sunshade apparatus 10. The petals 100 each include a leaf 110. The petals, with their leaves, will be discussed in detail in conjunction with FIGS. 6, 7, 8, 9, and 10. The rings will be discussed in detail in conjunction with FIGS. 3, 4, 5, and 11.

FIG. 3 comprises a perspective view of the rings 20, 50, and 70, showing the rings spaced apart from each other. FIG. 11 comprises a view in partial section of the rings 20, 50, and 70, with a petal 100 disposed adjacent the three rings. For a detailed discussion of the rings, attention will be directed primarily to FIGS. 3 and 11.

FIG. 4 comprises an enlarged perspective view of a portion of the petal ring 70. FIG. 5 comprises a view in partial section of a portion of the petal ring 70 taken generally along line 5—5 of FIG. 4. The relationship between the petals 100 and the petal ring 70 is best discussed in conjunction with FIGS. 4, 5, and 10, and reference will be made to those Figures in discussing that relationship.

For the primary attachment of the lens cover and sunshade apparatus 10 to the camera barrel 4, a threaded engagement is made between the base ring 20 and the lens barrel 4 by means of an externally threaded portion 24 of the base ring 20 which engages in an internally threaded portion of the lens barrel 4. Such internally threaded portion is typical of most cameras. The externally threaded portion 24 is disposed on, or comprises, a rear cylindrical portion of the base ring 20.

The base ring 20 includes a cylinder body 22 which has a generally irregular configuration, internally and externally, in that several different diameters, including grooves, flanges, and the like, are involved. The external configuration of the base ring 20 involves the irregular, as opposed to smooth, configuration because of the coupling together of the cam ring 50 and the petal ring 70 to the base ring 20, and the coupling of the base ring 20 to a camera lens barrel.

Adjacent the rear threaded portion 24 of the base ring 20 is an outwardly extending flange 26. The outer diameter of the flange 26 is greater than the outer diameter of the externally threaded portion 24, since the flange 26 is designed to extend slightly outwardly radially beyond the outer diameter of the lens barrel 4. The diameter of the exterior threaded portion 24 is substantially less than the outer diameter of the lens barrel 4 since the threaded portion 24 engages an internally threaded portion of the lens barrel 4.

The flange 26 includes a shoulder 28, remote from or forwardly of, the threaded portion 24. The shoulder 28 mates with a portion of the cam ring 50, as will be described below. Extending forwardly from the flange 26 is a front cylindrical portion 30 of the base ring 20. A groove 32 extends circumferentially about the front or forward cylinder 30. The groove extends radially inwardly with respect to the front cylinder 30 for a relatively short distance. The groove cooperates with a radially inwardly extending flange 76 of the petal ring 70 to lock the petal ring 70 and the cam ring 50 to the base ring 20, as will be discussed below.

Within the base ring 20 is a pair of relatively short bores 34 and 36. The bore 34 comprises a rear bore, which is generally cylindrical in configuration. The bore 36 comprises a sloping, outwardly extending bore which extends from the forward portion of the rear bore 34 to a front face 38 of the base ring 20. The front face 38 is substantially parallel to a rear face 40.

The threaded portion 24 extends forwardly from the rear face 40 to the flange 26, which acts as a stop to limit the threaded engagement between the lens barrel 4 and the base ring 20. The base ring 20 is preferably snugged against the lens barrel 40 to secure the base ring 20, and the other rings or elements associated therewith, which comprises the apparatus 10, to the camera 2.

The cam ring 50 comprises a generally cylindrical body 52 which includes a radially inwardly extending flange 53 at the forward portion of the cylinder 52. A shoulder 56 comprises the rear face of the flange 53, and separates a forward bore 54 from the rear bore 58 of the cam ring 50. The internal diameter of the bore 54 is slightly less than the internal diameter of the bore 58 and the internal diameters of both bores 54 and 58 are dimensioned according to the external diameters of the flange 26 of the cylinder 30 of the base ring 20.

The internal diameter of the forward bore 54 is slightly greater than the external diameter of the forward cylindrical portion 30 of the base ring 20, and accordingly the cam ring 50 fits over the base ring 20, with the forward cylindrical portion 30 extending through the bore 54. The external diameter of the flange 26 of the base ring 20 is greater than the internal diameter of the forward bore 54 of the cam ring 50, but is less than the internal diameter of the rear bore 58 of the cam ring 50. Accordingly, the front face 28 of the flange 26 is disposed against the rear face or shoulder 56 of the flange 53 of the cam ring 50.

When the cam ring 50 is disposed on the base ring 20, the length or thickness of the flange 53 is slightly less then the distance between the front face or shoulder 28 of the flange 26 and the rear portion of the groove 32 in the forward cylindrical portion 30 of the base ring 20. Therefore, as indicated above and as discussed in more detail below, the petal ring 70 fits against the cam ring 50, with the inwardly extending flange 76 of the petal ring 70 extending into the groove 32 to hold the petal ring, the cam ring, and the base ring together. It will be noted that the cylindrical portion 52 of the cam ring 50 extends rearwardly of the flange 26 of the base ring 20, and accordingly extends rearwardly, a short distance, on the lens barrel 4 of the camera 2.

On the front face 62 of the cam ring 50 are a plurality of cams 64. A single cam is shown in FIG. 11, but a plurality of the cams is illustrated in FIG. 3. It will be noted, as best shown in FIG. 3, that the cams comprise individual segments extending upwardly or outwardly from the face 62 of the cam ring 50, and the cams are disposed on the face 62 at a skew angle between the longitudinal axis of the cams and circles formed by the outer periphery of the cylinder 52 and the inner periphery of the flange 53, the latter of which defines the forward or front portion of the bore 54.

The plurality of cams 64 comprise the same number as there are petals 100, since the movement of the petals is accomplished through movement of the cams. In turn, the movement of the cams 64 results from rotational movement of the cam ring 50 relative to the petal ring 70. While individual cams 64 are shown as being of a generally rectangular configuration, it will be understood that a cam of a generally cylindrical configuration could be used in place of the configuration of the cam 64 as illustrated in FIG. 3. That is, instead of the rectangularly configured cam 64, a cylindrical pin extending outwardly from the face 62 of the cam ring 50 may be used, as desired.

Spaced apart on the outer periphery of the cylinder 52 are a plurality of outwardly extending knurled or milled portions 68. The milled portions comprise raised portions which are spaced apart from each other and which provide a frictional engagement between the cam ring 50 and the fingers of a user for positive contact with the cam ring by a user for rotating the cam ring to actuate the apparatus of the present invention.

The petal ring 70, shown in FIGS. 3, 4, and 11, and a portion of which is also shown in partial section in FIG. 5, comprises a relatively short, lengthwise, cylinder 72, which includes a bore 74 extending therethrough. Extending for a short distance radially inwardly with respect to the bore 74 is the flange 76. The flange 76 extends inwardly from the rear of the cylinder, adjacent a rear face 78. The rear face 78 is irregular because a plurality of petal recesses 82 extends along the cylinder 72 axially with respect to the length of the petal ring 70. Parallel to the rear face 78 is a front face 80. The petal recesses 82 extend between the rear face 78 and the front face 80, spaced apart from each other in a regular fashion, as best shown in FIGS. 3 and 4. Also extending inwardly or forwardly from the rear face 78 is a pair of pivot grooves 84 in each petal recess 82. The pivot grooves 84 are best shown in FIGS. 4 and 11.

With the cam ring 50 disposed on the base ring 20, and the shoulder or face 56 of the cam ring 50 disposed against the shoulder or face 28 of the base ring 20, and with the plurality of petals 100 secured to the petal ring 70, the petal ring 70 is secured to the base ring 20. The cams 64 extend into the cam grooves 82, and mate with grooves in the petals, as will be discussed below. The flange 76 extends into the groove 32 of the base ring 20 to securely hold the three rings together. The inner diameter of the bore 74 is substantially the same as the outer diameter of the cylinder portion 30 of the base ring 20. The respective diameters define an interference fit so that deformation of the ring 70, including the flange 76, occurs as the petal ring 70 is disposed on the base ring 20. However, the material out of which the petal ring 70 is made is of sufficient flexibility to allow deformation, primarily in the flange 76, to occur without either a rupture in the petal ring 70 or a permanent deformation occurring. At such time as the flange 76 registers with the groove 32, the flange 76 extends into the groove 32 to lock the petal ring 70 securely to the base ring 20, with the cam ring 50 disposed therebetween.

With the petal ring 70 in place, there is sufficient space between the front face 62 of the cam ring 50 and the rear face 78 of the petal ring 70, and between the rear face 60 of the cam ring 50 and the shoulder or face 28 of the base ring 20, to allow the cam ring 50 to rotate about the base ring 20 in response to the manual movement of the ring 50 by a user.

The petal recesses 82 comprise a plurality of generally rectangular recesses or relieved portions which extend radially inwardly from the outer periphery of the cylinder portion 72 of the cam ring 70. This is best shown in FIG. 10. The cam recesses extend through the length of the cylinder 72, between the front face 80 and the rear face 78 of the cylinder 72. The recesses 82 are spaced apart from each other in a regular fashion to accommodate the petals 100.

Each petal 100, as best shown in FIGS. 6, 7, 8, and 9, and also as shown in FIGS. 10 and 11, includes a cylinder 102. Each cylinder 102 includes a pair of pivot pins 104 and 106 extending outwardly from the ends of the cylinder, longitudinally aligned with each other and coaxial with respect to the cylinder. A cam groove 108 extends radially inwardly from the outer surface of the cylinder 102 and in a curved line generally longitudinally axially with respect to the cylinder 102. A cam groove 108 is best shown in FIG. 9.

A leaf 110 is secured to the cylinder 102. Each leaf 110 is of a generally fan shaped configuration, extending from a minimum width at the cylinder 102, where it is secured, to a maximum width remote from the cylinder 102, as best shown in FIG. 6. Each petal includes a pair of side edges 112 and 114. The sides 112 and 114 extend outwardly from adjacent the cylinder 102 at a diverging angle with respect to each other, to an outer edge 116. The outer edge 116 is curved, as also best shown in FIG. 6.

As best shown in FIGS. 7 and 8, the leaf 110 is curved between the side edges 112 and 114, and accordingly the leaf is not of a planar configuration. Preferably, the leaf 110 extends smoothly outwardly from the cylinder 102, to which it is secured, to the outer edge 116. It will be noted that the minimum width of the petal, adjacent the cylinder 102, is slightly greater than the overall length of the cylinder 102.

Each leaf 110 is secured to a cylinder 102 to comprise a petal 100. Each petal 100 is in turn disposed within a petal recess 82. The length of each petal recess 82 is sufficient to accommodate a cylinder 102, with the pivot pins 102 and 106 extending into the pivot grooves or slots 84. The petals 100 are inserted into the petal ring 70 from the rear face 78. They extend through the petal recess 82, with the pivot pins 104 and 106 disposed, and pivotally or movably journaled for rotation, within the pivot grooves 84.

With the petals 100 disposed on the petal ring 70, the petal ring 70 is ready to be secured to the cam ring 50 and the base ring 20. The petal ring 70 is accordingly located with respect to the cam ring 50 so that the cams (pins) 64 extend into the cam grooves 108 of the cylinders 102. With the appropriate registration of the cam ring 50 and the petal ring 70 accomplished, the petal ring is ready to be locked onto the base ring 20. This is accomplished as discussed above, by forcing the petal ring 70 onto the forward or front cylindrical portion 30 of the base ring 20, until the inwardly extending flange 76 registers with and is inserted and extends into the groove 32 on the base ring 20. At such time as the three rings, with the petals 100 secured to the petal ring 70, are secured together, the apparatus 10 is ready to be secured to a camera, such as the camera 2 of FIG. 1.

The overall length of the cam groove 108 in the cylinder 102 extends for an arcuate distance of greater than ninety degrees on the outer periphery of the cylinder 102. Accordingly, each petal 100 moves through an arc of greater than ninety degrees, from the full closed position of the apparatus 10, as shown in FIG. 1, to a full open position. An intermediate position of the apparatus 10 is shown in FIG. 2. It will be noted, from both FIGS. 1 and 2, that the leaves 110 of each petal overlap the adjacent leaves, with one edge disposed underneath the adjacent leaf on one side, and the other edge of each leaf disposed on the top or outside of the adjacent petal on the other side. Such overlapping orientation or juxtaposition arrangement provides an effective, easily actuable lens cover and sunshade.

As will be noted from FIG. 1, the center of the outer edge 116 of each leaf 110 is the juncture point of the petals in the full closed position. The beginning and ending points of the cam groove 108 of each cylinder 102 defines the inner and outer limits of the pivoting action of each petal. With the maximum inward pivoting of each petal being limited to substantially ninety degrees from the longitudinal axis of the three rings which comprise the apparatus 10, and with the leaves 110 of the petals 100 overlapping each other, a relatively rigid lens cover is defined by the apparatus 10 in the closed or folded position illustrated in FIG. 1. The lens within the barrel 4 is accordingly protected by the overlapping leaves of each petal and by the inner limits of the pivoting of each petal.

As the cam ring 50 is rotated about its longitudinal axis (and accordingly about the longitudinal axis of the other two rings) the cams 64 move in the cam slots 108 to cause the petals 100 to rotate about their pivot pins 104 and 106. As indicated above, the pins 104 and 106 are disposed within the pivot grooves 84 of the petal recesses 82 in the petal ring 70. The outward pivoting of each petal is accomplished in substantially simultaneous movement of all of the petals since the cam grooves 108 are in substantially parallel registration with respect to each other. The outward divergence of the side edges 112 and 114 of each leaf 110, from the cylinders 102 to the outer edges 116, permits the leaves to pivot more than ninety degrees and still maintain an overlapped arrangement, as shown in FIG. 2, to continue throughout the length of travel, arcuately, of the petals 100 from the fully closed position of FIG. 1 to a full open position (not shown). In the full open position, which is greater than ninety degrees from the fully closed position of FIG. 1, the petals 100 overlap each other to some degree to provide substantial shade from the sun or other light source. At the same time, the arcuate pivoting of the apparatus 10 does not interfere with the lens of the camera and does not narrow the field which the lens and the camera are able to otherwise include. Conversely, the relatively large arcuate pivoting of the leaves allows the apparatus 10 to continue functioning as a lens shade for a camera lens, and allows the camera lens to function to its optimum capabilities.

Again, referring to FIGS. 1 and 2 in particular, it will be understood that the petals 100 pivot outwardly and inwardly to define a three dimensional iris. That is, the overall effect of the movement of the petals, with respect to the lens cap configuration, in which the petals are in their full closed position, is similar to the typical iris movement in which a maximum diameter opening becomes gradually smaller in a relatively symmetrical manner. In the movement of the iris in the opposite direction, from a full close position, a very small hole or opening first occurs, and then a larger opening is progressively made, with the opening being substantially symmetrical at all times, until a maximum or full size opening results. With the apparatus of the present invention, the iris type opening and closing occurs, in that the opening and closing is substantially symmetrical as the iris petals move through an arc of greater than ninety degrees from a full close position to a full open position. The typical iris of the prior art usually has a minimum number of segments or petals, but the pivoting action is a sliding action of the segments or petals and is usually accomplished in a single plane, or in adjacent parallel planes, depending on the particular arrangement of the individual segments or petals. With the apparatus of the present invention, the pivot point of each petal is fixed, and the petals move in a pivoting manner as opposed to a sliding manner, and through an arc which may be ninety degrees or more from the plane of each petal in the full closed or the full open positions. It will be understood that each leaf 110, as discussed above, is not planar in configuration, but is slightly curved, from one side edge to the opposite side edge. The side edges are not perpendicular to the longitudinal axis of the cylinder at the base or inner portion of each petal, where the leaf is secured to the cylinder. The arc or curvature of each leaf is along a lateral or side to side axis, as opposed to the length, longitudinal axis, or along the petal.

The pivoting of each leaf 110 is perpendicular to the central longitudinal axis of each cylinder 102, which axis extends through the pins 104 and 106 of each cylinder. The slots 108 extend the length of the cylinders 102, and they extend arcuately for a distance greater than ninety degrees. Rotation of the cam ring 50 accordingly results in the pivoting of the petals 100 and of their leaves 110.

As previously indicated, the base ring 20 is secured in place on a camera lens barrel, and the petal ring 70 is secured by a relatively tight or close fit or frictional engagement between the inner diameter of the bore 74 and the outer diameter of the cylinder 30 of the rings 70 and 20, respectively. The frictional engagement prevents relative rotary movement between the two rings, and the engagement of the flange 76 and the slot or groove 32 of the two rings prevents relative axial or longitudinal movement between the two rings.

The cam ring 50 is disposed between the flange 26 of the base ring 20 and the petal ring 70, with the cams or pins 64 extending into the slots 108 of each petal. The cam ring 50 is prevented from axial movement on the cylinder 30, which could withdraw the cams from the grooves, by the respective dimensions of the cylinder 30, the longitudinal or axial length of the cylinder 52 of the ring 50, and the flange 76 and groove 32. However, the ring 50 rotates relative to the rings 20 and 70 under a force exerted by a user of the apparatus the relative rotation causes the petals to pivot as the cams or pins 64 move along the grooves 108 in the cylinders 102 of the petals 100.

The friction between the cylinder 30 of the ring 20 and the bore 54 of the ring 50 is sufficient to prevent the undesired relative rotary movement between the ring 50 and the ring 70 which could result in undesirable pivoting of the petals.

FIG. 13 is a top or end view of a ring 210, which comprises the inner ring for the lens cover and sunshade apparatus 200. The ring 210 is shown in FIG. 13 as including two types of petals, a single master petal 300 and a common petal 270. The common petal 270 is one of a plurality of petals which are substantially identical.

FIG. 14 is a view in partial section through the ring 210 and through a common petal 270, taken generally along line 14—14 of FIG. 13. FIG. 15 is a view in partial section of the ring 210, taken generally along line 15-15 of FIG. 13, through the master petal 300. For the following description of the inner ring 210, attention will be directed primarily to FIGS. 13-15.

The inner ring 210 includes a generally circular base 212 which is adapted to fit over the outer periphery of the lens barrel 4 of a camera 2. The base 212 includes an axially rear end or side 214 and an axially front end or side 216. An inner peripheral edge or side 218 extends between the rear end 214 and the front end 216. The terms "rear" and "front" and "inner" refer to the orientation of the ring 210 with respect to the camera 2, and most particularly, to the lens barrel 4, and the axially rear end or side 214 is oriented or disposed longitudinally, with respect to the lens barrel 4, toward the body of the camera 2, while the axially front end or side 216 extends forwardly of, or away from the camera.

An outer peripheral edge or side 220 is disposed substantially parallel to the inner peripheral side 218. The outer peripheral edge or side 220 extends forwardly from the axially rear end or side 214 and it terminates in a shoulder 224. Between the rear end 214 and the shoulder 224 is an outwardly extending ridge 222. The ridge 222 extends circumferentially about the base 212. The purpose of the shoulder 224 and the ridge 222 will be discussed in detail below in conjunction with the outer ring 240.

Extending radially outwardly from the axially front end or side 216 are a plurality of petals. The petals are of two types, and include a single master petal 300 and a plurality of ordinary petals 270. The plurality of petals 270 are substantially identical to the master petal 300 in configuration and construction, with two exceptions. The exceptions will be discussed in conjunction with FIG. 15, below.

Figure 23:
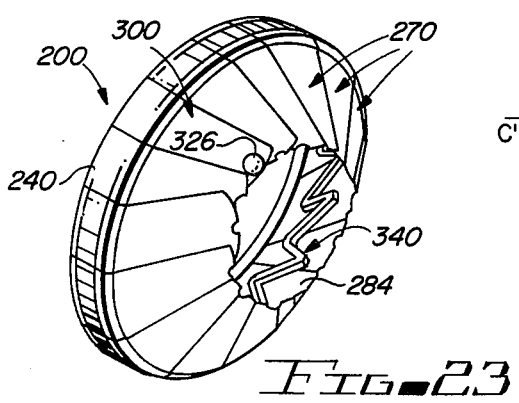
FIG. 23 is a perspective view of a portion of the apparatus of FIG. 12.

As shown in FIG. 13, the petals are spaced apart from each other, with the spacing between the petals reserved for petals from the outer ring 240, as shown in FIG. 16. Thus, when the two rings are together, the petals completely occupy the area or space radially outwardly from the assembled rings throughout the entire circumference of 360° of the assembled rings. The petals overlap, as will be discussed below, and comprise the cover and sunshade for the lens. It will be noted that the petals are formed extending radially outwardly from the rings. For use, as shown in FIGS. 12 and 23, the petals pivot radially inwardly.

A petal 270 is shown in cross section in FIG. 14, and is shown in plan view in FIG. 13. Each petal 270 includes a blade 272 which extends from its ring, either the ring 210 or the ring 240, radially outwardly. Each petal 270 terminates in an outer edge 274. The outer edge 274 is gently curved in an arcuate manner between a pair of side edges 278 and 280. The side edges 278 and 280 are not parallel, but rather are diverging slightly from each other as they extend from the ring outwardly toward the outer edge 274. The outer edge 274 includes a half-circle notch 276 centrally located with respect to the outer edge 274 between the edges 278 and 280.

Each petal includes two surfaces, an outer surface 282 and an inner surface 284. The outer surface 282 is the surface which faces away from the camera, as best seen in FIGS. 12 and 23, and away from the lens. The inner surface 284 is that surface which is facing inwardly, or toward the lens (not shown) within the lens barrel 4 of the camera 2.

On the inner surface 284 of the petal 270, and adjacent the side edge 278, are a pair of hooks 286 and 288. The hooks face each other, and between them is defined an opening 290. A pair of hooks, like hooks 286 and 288, are disposed on each of the petals, both the petals 270 and the master petal 300. The purpose of the hooks is to allow a spring 340 to be secured to the petals, after the inner ring 210 and the outer ring 240 are secured together, for purposes of biasing the petals in both the open and the closed positions. This will be discussed more in detail below, in conjunction with the operation of the spring and the overall assembled apparatus 200.

The master petal 300 shown in FIG. 15 is substantially identical to the petals 270, as shown particularly in FIG. 14, and as discussed in conjunction with the inner ring 210. The master petal 300 includes a blade 302 having an outer edge 304 extending between a pair of side edges 306 and 308. The side edges 306 and 308 diverge, as do the side edges 278 and 280 of the petals 270. The size of the master petal 300 is substantially identical to that of the other petals 270.

The master petal 300 includes an outer surface 310 and an inner surface 312, which also are substantially identical to the outer and inner surfaces 282 and 284, respectively, of the petals 270. Similarly, the master petal 300 includes a pair of hooks 314 and 316, which define between them an opening 318. The hooks 314 and 316, and the opening 318, are substantially identical to the hooks 286 and 288 and their opening 290, respectively, as discussed above.

The primary difference between the master petal 300 and the petals 270 is found in the outer edge 304 of the master petal 300. The outer edge 304 does not have a notch, as do the petals 270. Rather, the outer edge 304 of the master petal 300 is continuous. At the center of the outer edge 304, and extending outwardly substantially perpendicularly from the inner surface 284, is a post 320. Secured to the post, outwardly from the blade 302, is a bead 322. Axially aligned with the post 320 is a post 324, which extends outwardly from the surface 310 and perpendicular thereto. Secured to the post 324 remote from the blade 302 is another bead 326. The bead 326 is somewhat larger in diameter than the bead 322. It comprises a pull or knob for actuating the lens cover apparatus 200. The bead 322, and its post 320, cooperate with the half-circle notches 276 in the petals 270 to secure the petals in their inward, closed position, and they also cooperate with the notches and the petals for opening or actuating the apparatus 200.

The half circle notches or recesses 276 provide three functions in cooperation with the bead 322 and its post 320. The first function is that of initially helping to open, by a cam action, the apparatus. The second function is in the closing of the apparatus by camming together all of the petals as the bead 322 contacts the notches or recesses 276 at the inner position, such as shown in FIG. 12. Finally, the bead 322 and the post 320 cooperate with the notches or recesses in sealing the center hole where the petals meet. As is understandable, when the petals are moved to their full inward position, a hole will be defined by the center notches or recesses 276 of the petals 270.

The diameter of the bead 322 is greater than the hole and the diameter of the post 320 is substantially the same as the diameter of the hole, and the post 320 thus cooperates with the notches to seal the hole, with the bead 322 on the interior of the hole, and the bead 326, secured to its post 324, extending outwardly from the master petal and over the hole.

For opening the apparatus, a pull in a generally outwardly direction is applied to the larger bead or knob 326 which causes the bead 322 to cam against the outer portions of the petals 270 adjacent to the notches 276 to begin the opening process for the apparatus 200. The opening process continues under the pull of the master petal and of the over- and under-lapping edge configuration of the side edges of the blades of each petal with respect to the adjacent petals. This effect is further enhanced by the action of the spring 340, as discussed below.

FIG. 16 is a top or end view of the outer ring 240. FIG. 17 is a view in partial section through the ring 240 of FIG. 16 and through one of its common or ordinary petals 270. For the following description of the outer ring 240, attention will be directed primarily to FIGS. 16 and 17.

FIGS. 16 and 17 illustrate the outer ring 240. The outer ring 240 includes a base 242 which is about the same size, with respect to the length of the base 242, that is, between the axial front and rear sides or edges, as the base 212 on the ring 210. However, since the ring 240 is the outer ring, its lower diameter, adapted to fit over and against the outer peripheral edge or side 220 of the inner ring 210, is larger than the interior diameter of the ring 210, and is about the same as the outer diameter of the base 212 of the ring 210 below the shoulder 224.

The outer ring 240 includes an axially rear end or side 224 which, when the rings are secured together, as shown in FIG. 18, is aligned with the axially rear end or side 214 of the inner ring 210. The outer ring 240 also includes a front or forward end or side 246. The ring 240 also includes an inner peripheral edge or side 248 and an outer peripheral edge or side 250. The inner peripheral edge or side 248 includes an inwardly extending groove 252 which receives the outwardly projecting ridge 222 of the inner ring 210 to secure the two rings together.

The outer ring 240 includes a recess 254 between the petals 270. The recess 254 is disposed against the shoulder 224 of the inner ring 210 when the two rings are secured together, as shown in FIG. 18.

The petals 270 secured to the outer ring 240 are connected to the outer ring by a hinge portion 256. The hinge portion 256 is substantially identical to the hinge portion 226 which secures the master petal 230 and the petals 270 to the inner ring 210.

FIG. 18 is a view in partial section of the assembled rings 210 and 240, and through a common petal 270. When the rings 210 and 240 are secured together, as shown in FIG. 18, the rings are matingly engaged and secured together by the cooperation of the ridge 222 and the groove 252. The width of the shoulder 224 of the inner ring 210 is substantially the same as the width of the outer ring 240 at the recess 254. The hinges 226 and 256 of the inner and the outer rings, respectively, are appropriately aligned radially for joint movement. The orientation of the petals 270, and including the master petal 300, provides the overlapping effect best shown in FIG. 21. It will be understood, as discussed above, that adjacent petals are from opposite rings, with alternating petals being from the same ring. This provides the overlapping effect of the petals with respect to the spacing of the petals for adjacent edges, as again best shown in FIG. 21.

Referring again to FIGS. 13 and 16, the master petal 300 of FIG. 13, when the two rings 210 and 240 are secured together, as for example by the superimposing of the ring 240 from FIG. 16 onto the ring 210 of FIG. 13, comprises the first petal, clockwise, of the assembled combination. The second petal, clockwise, comprises the first petal 270 of ring 240, from FIG. 16, and the third petal is the petal 270 from ring 210, of FIG. 13. When the petals are properly adjusted to their over-under relationship, as shown in FIGS. 12 and 21, adjacent petals are from opposite rings.

Figure 19:
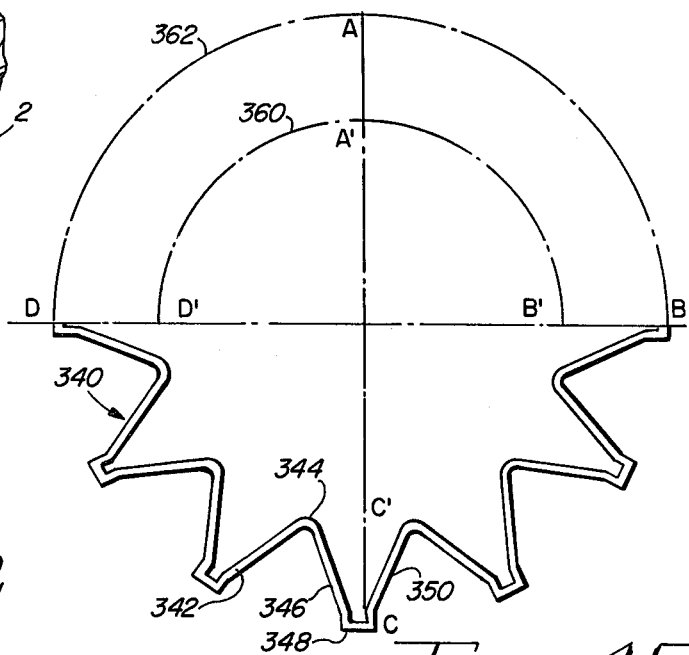
FIG. 19 is a schematic representation of the spring used in the alternate embodiment of the apparatus of the present invention.
Figure 20:
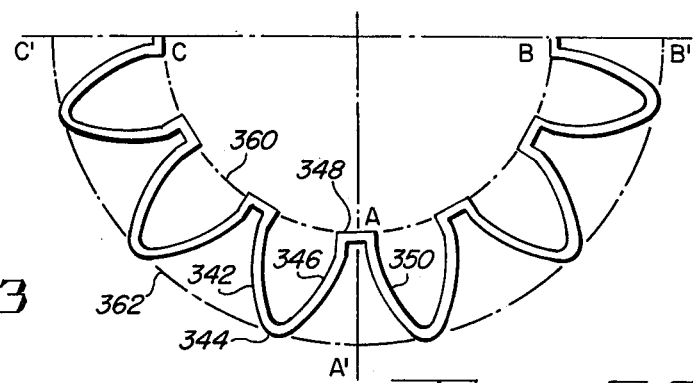
FIG. 20 is a schematic representation of the spring of FIG. 19 in a different position.

FIGS. 19 and 20 are schematic representations of the over-center spring 340 utilized with the petals 270, and with the master petal 300, in actuating the petals from the closed position, shown in FIG. 2, to the open position, as shown schematically in FIG. 24, and back again to the closed position. In going from the closed position to the open position, and vice versa, the petals go through a transition or intermediate step, as shown in FIGS. 22A through 22D, as the spring 340 changes between its two rest positions. The spring 340, in both of its rest positions, is biased to remain in such rest position until it moves past a half-way point. From its half-way point, it biases itself through its spring action to its opposite rest position. The movement of the spring 340 between its two rest positions is illustrated in conjunction with FIGS. 22A, 22B, 22C, and 22D. For the following discussion concerning the spring 340, reference will be made primarily to FIGS. 19, 20, and 22A ... 22D. Additional reference to other Figures will also be made.

The spring 340 is shown in FIG. 19 in its open position of rest, and is shown in FIG. 20 in its closed position of rest. The spring 340 includes a plurality of adjacent spring elements disposed in an angular orientation with respect to each other and each element is connected to an adjacent element through two links, a smooth reverse connector link and a straight connector link. The straight connector links are used to connect the spring 340 to each of the petals at the petal hooks through the opening between the petal hooks, as discussed above, primarily in conjunction with FIGS. 13, 14, 15, 16, and 17. The securing of the spring 340 to the petals is best shown in FIG. 21.

In FIGS. 19 and 20, three adjacent elements 342, 346, and 350 are identified. A smooth reverse connector link 344 is shown connecting the elements 342 and 346, and a straight connector link 348 is shown connecting the elements 346 and 350. The elements 342 and 346 are disposed at an included angle with respect to each other, and the included angle is preferably an acute angle. Similarly, an acute angle is defined between the adjacent elements 346 and 350, except that the ends of the elements 346 and 350 are connected by a straight line and not by a reverse line.

Between the position of spring 340, as shown in FIG. 19, and the position of spring 340 as shown in FIG. 20, the elements and their connector links reverse, which causes a slight bending of the adjacent elements, as shown in FIG. 20, toward the reverse connector link. The elements 342, 346, and 350, and the other elements of the spring 340, are shown in FIG. 19 as being relatively straight between their connector links. However, the elements in FIG. 20 show a slight curvature between their connector links. Depending on the size of the spring 240, there may be a more or less curve between adjacent elements of the spring when the spring is secured to the petals in both the open and closed positions. This is shown in FIG. 21, also.

Two concentric circles 360 and 362 are schematically represented in FIGS. 19 and 20. Circle 360 is the inner circle, and circle 362 is the outer circle. The inner circle in FIG. 1 extends through the reverse connector links of the spring 340, and the outer circle 362 extends through the outer or straight connector links 348 of the spring 340. However, when the spring 340 is reversed, then the inner circle 360 extends through the straight connector links 348, and the outer circle 362 extends through the smooth reverse connector links 344. In actuality, the preceding statements may be more accurately reversed, and indicating that the smooth, reverse connector links 344 are on the circumference of the inner circle 360 in FIG. 19, and when the spring 340 is reversed, the smooth, reverse connector links 344 extend through the outer circle 362, shown in FIG. 20. Similarly, when the spring is in the open position, as shown in FIG. 19, the straight, outer connector links 348 lie on the circumference of the outer circle 362. When the spring reverses itself, to its closed position, as shown in FIG. 20, the straight connector links 348 then lie on the inner circle 360.

Figure 22A:
FIGS. 22A, 22B, 22C and 22D are sequential illustrations of the functioning of the spring of FIGS. 19 and 20.

In FIG. 19, the reverse connector links 344 are shown disposed on the inner circle 360. At the four cardinal points, defining perpendicular diameters of the spring 340 and also of the circles 360 and 362, the reverse connector links 344 are illustrated as being generally along the circle 360 at points A', B', C', and D'. The outer or straight connector links of the spring 340 in its open position, shown in FIG. 19, illustrate the straight connector links lying along the outer circle 362, with the four cardinal locations of the circle 362 being represented by A, B, C, and D. The four letter positions, of A, B, C, and D, and A', B', C', and D', represent the movement of the elements and the connector links as the elements move from the open position of FIG. 19 to the closed position of FIG. 20, sequentially in FIGS. 22A, 22B, 22C, and 22D. In FIG. 22A, the outer or reverse connector links 348 are disposed along the outer circle 362, aligned with the four points A, B, C, and D. The smooth, reverse connector links 344 are disposed along the interior circle 360, and identified with the four cardinal points A', B', C', and D'. In FIG. 22B, the petals of the apparatus 200 are beginning to close, by the user of the apparatus 200 moving the petals 270 and 300 upon actuation of the master petal 300 at the knob or bead 326 (see FIG. 15).

In the first movement of the petals from their full open position to their full closed position, the straight connector links 348 move arcuately from maximum diameter of the circle 362 to an intermediate position, as shown in FIG. 22B, with the outer cardinal points A, B, C, and D moving inwardly to a lesser diameter from the maximum diameter 362 to a circle 364, schematically represented in FIG. 22B. The A, B, C, and D points have moved out of the concentric circle 362 with respect to the circle 360 so that an intermediate position circle 364 is defined. The movement of the over-center spring 340 at the position shown in FIG. 22B still retains a bias urging the petals to the open position, and against the biasing force of the user of the apparatus. The outer circle 364 has a larger diameter than the circle 364'. However, the diameter of the inner circle 364' is larger than the diameter of the inner circle 360 of FIG. 22A.

The circle 364 is substantially larger than the circle 364' in FIG. 22B, with the circle 364 being somewhat smaller in diameter than the open or large circle 362, and with the circle 364' being somewhat larger in diameter than the inner circle 360 of FIG. 22A.

Figure 22C:
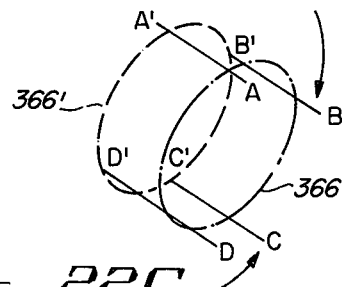
Figure 22B:
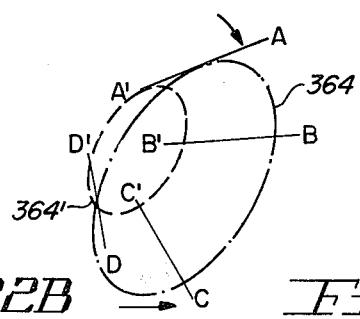

When the spring 340 is moved to the intermediate or half-way position, as shown in FIG. 22C, the reverse connector links and the straight connector links are substantially parallel to each other, or on a pair of parallel and equal diameter circles 366 and 366'. The circle 366 is the outer circle which includes the cardinal point letters A, B, C, and D, which is the circle coincident with the location of the straight connector links 348. The circle 366' is the circle coincident with the four cardinal points A', B', C', and D', which is coincident with the circle on which the reverse connector links 344 lie. The circles 366 and 366' are substantially the same diameter and are generally parallel to each other.

From the position of the spring 340 illustrated in FIG. 22C, the bias of the spring 340 reverses from that discussed above in conjunction with FIGS. 22A and 22B, and accordingly biases the petals to the closed position. As the spring 340 moves over center, it reverses its bias. The position of the spring 340 as schematically represented in FIG. 22C comprises the center point in the reversal of the spring between the open position shown in FIG. 19 and the closed position shown in FIG. 20. The bias of the spring 340 is such that positive effort by a user of the apparatus 200 is no longer required for the closing of the shutter apparatus 200 from the middle position shown in FIG. 22C to the closed position shown in FIG. 22D.

Figure 22D:
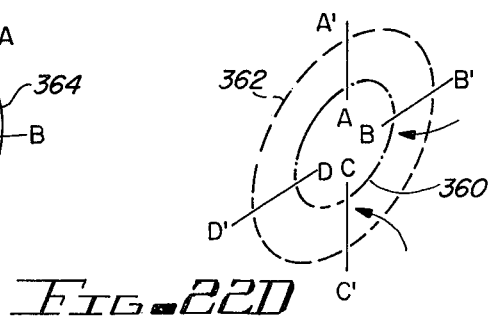

In FIG. 22D, the spring 340 has completed its reversal from that illustrated in FIG. 22A. The inner circle 360 now is coincident with the straight connector links 348, with the cardinal points A, B, C, and D located inwardly. The reverse connector links 344 are now disposed on the outer circle 362, with their coincident points A', B', C', and D'.

With the straight connector links 348 secured in the hooks, such as the hooks 314 and 318 of the master petal 300, and the hooks 286 and 288 of the petals 270, as shown in FIG. 21 and also as indicated in FIG. 23, it will be understood that the reverse connector links 344 move along the inside surfaces 284 and 312, respectively, of the petals 270 and of the master petal 300. The springs reverse themselves between the open and closed positions, and vice versa, of the petals and the apparatus 200.

Figure 24:
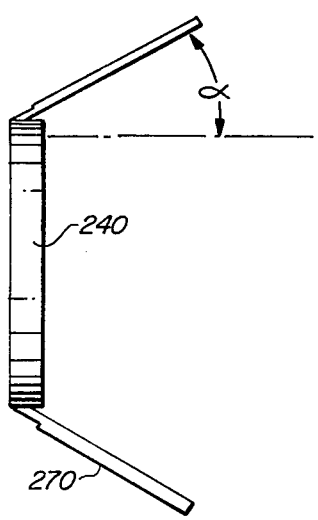
FIG. 24 is a schematic side view of a portion of the alternate embodiment illustrating the apparatus in its open position.

For practical purposes, the petals do not extend a full 180° between the closed position shown in FIG. 12, and also in FIG. 22D, to the full open position schematically illustrated in FIG. 22A. Rather, the constraints of the construction of the petals and the practical requirement of a sunshade for a lens limits the open condition of the petals to that schematically illustrated in FIG. 24. The petals 270 are shown in FIG. 24 as extending some degree alpha above the horizontal with respect to the horizontal or longitudinal axis of the lens barrel 4 of the camera 2. The angle alpha is defined as an acute angle from the longitudinal axis of the lens, which, as a practical matter, requires somewhat greater angular movement than 90° from each petal of the plurality of petals comprising the apparatus 200. In the position shown in FIG. 24, the petals are out of the way of the image caught by the lens within the barrel 4, but yet they provide substantial shade for the lens, which is part of the purpose of the apparatus 200.

The petals travel little more than 90° to the full open position from the full closed position. From the full open position, as shown schematically in FIG. 24, the full closed position is slightly greater than a 90° arcuate movement of each petal, which results in a slight inward and central taper of the petals in their full closed position, defining a slight concavity with respect to the lens barrel 4. That is, the petals 270, and the master petal 300, as viewed in FIG. 12, do not present a relatively flat, planar surface when the apparatus 200 is in the closed position. Rather, there is a slight inward or concave taper to the petals. This is due to the action of the bead 322 and its post 320 in sealing the central hole defined by the notches or recesss 276 in the petals 270. As is understood, the over-center spring 340 tends to move, once it is over center, to lie in a plane with its connectors lying on a minimum diameter and a maximum diameter circles, and which circles are substantially concentric at a position of rest or of no bias. The spring is thus biased towards the positions of rest with the respective connector links lying on circles of minimum and maximum diameters.

In operation, the two rings 210 and 240 are secured together, as shown in FIG. 18, and the petals are then folded radially inwardly in an alternating fashion, with the edges of the petals disposed in an overlying and underlying (overlapping and underlapping) relationship, as shown in FIG. 21. With the petals folded inwardly, the spring 340 is then assembled to the hooks of each petal.

Once the spring 340 is secured to the petals, the cover and shade apparatus 200 is then ready for use on the lens barrel of the camera for covering and for shading the camera lens. It will be noted that the rings 210 and 240 are disposed about the outer periphery, circumferentially, of the lens barrel 4. A frictional fit between the assembled rings and the lens barrel is therefore used to maintain the shade and cover apparatus 200 fo the lens barrel 4 of the camera 2. This is in contrast to the threaded engagement of the shade and cover apparatus 10 of the embodiment of FIGS. 1-11.

Two different methods of camming the petals to their open and closed positions are discussed and disclosed with respect to the apparatus of the present invention, one being a pure cam situation, as included in the embodiment of the apparatus and of FIGS. 1-11. The second cam system is a combination system included in the apparatus 200 of FIGS. 12-24. In the latter system, the cam action is initially actuated by an outward or inward pull or push by the user of the apparatus on the knob 326, and the resulting cam action of the edges of the petal blades on adjacent petals. After the spring 340 reaches its half-way point, the spring then provides the bias to complete the opening or closing of the apparatus. Again, however, it is the cam action of the adjacent petals which causes the movement of the petals. The initial push or pull, up to the half-way position of the spring 340, is against the bias of the spring until the spring reaches its over-center position, as its mid-point, when the spring bias reverses.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Cover and shade apparatus for a camera lens, comprising, in combination:
   first ring means adapted to be secured to a camera;
   second ring means disposed on the first ring means and movable relative thereto, and including cam means;
   third ring means secured to the first ring means and disposed adjacent the second ring means, including a petal ring,
      petal means, including a plurality of petals secured to the petal ring and movable from a closed, cover positon to an open, shade position, and
      means in each petal of the plurality of petals for engaging the cam means of the second ring means for moving the petals in response to movement of the second ring means.

2. The apparatus of claim 1 in which the first ring means comprises a base ring including
   a first cylinder having a first bore extending therethrough,
   a threaded portion for securing the cylinder to the camera, and
   a groove spaced apart from the threaded portion for receiving the third ring means.

3. The apparatus of claim 2 in which the second ring means includes
   a second cylinder disposed on the first cylinder of the first ring means,
   a front face, and
   the cam means comprises a plurality of cams secured to the front face and engaging the plurality of petals for moving the petals in response to movement of the second ring means.

4. The apparatus of claim 3 in which the third ring means further includes
   a second bore extending through the petal ring for receiving the first cylinder of the first ring means, and
   a flange extending into the second bore and into the groove of the first ring means for securing the third ring means to the first ring means.

5. The apparatus of claim 4 in which the third ring means further includes a plurality of petal recesses in the petal ring for receiving the plurality of petals.

6. The apparatus of claim 5 in which each petal of the plurality of petals of the petal means includes
   a petal cylinder disposed in one of the plurality of petal recesses,
   a cam groove in the petal cylinder for receiving a cam of the plurality of cams of the cam means for moving the petal in response to movement of the second ring means, and
   a leaf secured to the petal cylinder and movable between the closed, cover position and the open, shade position.

7. The apparatus of claim 6 in which the third ring means further includes a pair of pivot grooves in each petal recess, and each petal cylinder includes a pair of pivot pins extending into the pair of pivot grooves.

8. The apparatus of claim 7 in which the cam groove in the petal cylinder extends axially with respect to the petal cylinder over an arcuate distance of greater than ninety degrees between the closed and open positions.

9. Cover and shade apparatus for a camera lens, comprising, in combination:
   ring means adapted to be secured to a camera, including
      first ring means adapted to be secured to the camera;
      second ring means movably disposed on the first ring means; and
      third ring means secured to the first ring means and disposed adjacent to the second ring means;
   petal means secured to the ring means and movable from a closed, cover position to an open, shade position, including
      a plurality of petals with each petal movably secured to the third ring means, and
      a cam groove in each petal of the plurality of petals; and
      cam means extending into the cam groove in each petal for moving the petal means between the two positions.

10. The apparatus of claim 9 in which the cam means comprises a plurality of cams secured to the second ring means and each cam of the plurality of cams is disposed in a cam groove and is movable with the second ring means for moving the petals.

11. The apparatus of claim 10 in which:
   the first ring means comprises a base ring secured to the camera;
   the second ring means comprises a cam ring movably disposed on the base ring; and
   the third ring means comprises a petal ring secured to the base ring and disposed adjacent the cam ring with the plurality of cams disposed in the cam grooves of the plurality of petals for moving the petals in response to movement of the cam ring.

12. Cover and shade apparatus for a camera lens, comprising, in combination:
   an inner ring adapted to be secured to a camera;
   an outer ring adapted to be secured to the inner ring;
   petal means including a plurality of movable petals secured to the inner and outer rings and movable between an open, shade position and a closed, cover position; and
   spring means secured to the petal means for urging the petals to the shade position and to the cover position.

13. The apparatus of claim 12 in which the petal means includes
   a first plurality of petals secured to the inner ring in a spaced apart relationship, and
   a second plurality of petals secured to the outer ring in a spaced apart relationship, and adapted to be in an alternating relationship with the first plurality of petals when the outer ring is secured to the inner ring.

14. The apparatus of claim 13 in which the petal means further includes means for securing the spring means to each petal.

15. The apparatus of claim 14 in which the plurality of petals of the petal means further includes a single master petal and the other petals of the plurality of petals are common petals.

16. The apparatus of claim 15 in which the petals of the petal means include an outer end remote from the inner and outer rings and the common petals include a recess on the outer ends, and the master petal includes a bead on its outer end adapted to contact the common petals adjacent the recesses for camming the common petals to the closed position and to the open position.

17. Cover and shade apparatus for a camera lens, comprising, in combination:
 ring means adapted to be secured to a camera, including
   a first ring secured to the camera, and
   a second ring secured to the first ring;
 petal means secured to the ring means and movable from a closed, cover position to an open, shade position, including a plurality of petals alternately secured to the first ring and to the second ring and disposed in a partially overlapping and underlying relationship with respect to adjacent petals; and
 cam means for moving the petal means between the two positions.

18. The apparatus of claim 17 in which the cam means includes the overlapping and underlying relationship of each petal of the petal means and an over-center spring secured to the petals of the petal means for urging the petals to the closed and open positions.

19. The apparatus of claim 18 in which:
 the petal means further includes a master petal and a plurality of common petals; and
 the cam means further includes a bead secured to the master petal for urging the common petals to the closed and open positions.

* * * * *